UNITED STATES PATENT OFFICE.

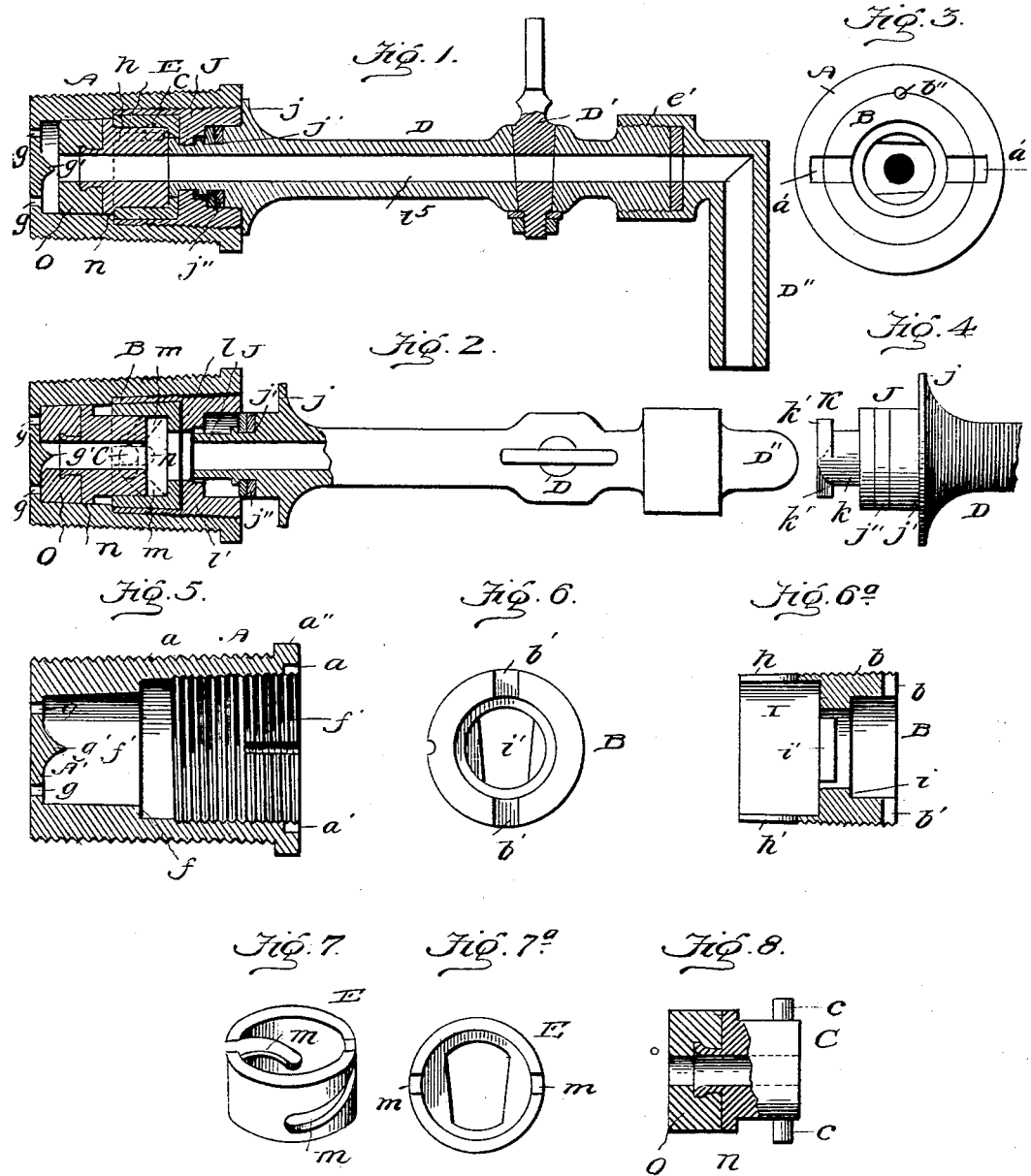

GEORGE CHAMPOUX, OF SALMON FALLS, NEW HAMPSHIRE, ASSIGNOR OF TWO-THIRDS TO HERBERT E. HAMILTON AND NAPOLEON BOISVERT, OF SAME PLACE.

COMBINED TAP AND FAUCET.

SPECIFICATION forming part of Letters Patent No. 593,513, dated November 9, 1897.

Application filed October 23, 1896. Serial No. 609,782. (No model.)

*To all whom it may concern:*

Be it known that I, GEORGE CHAMPOUX, a citizen of the United States, residing at Salmon Falls, in the county of Stafford and State of New Hampshire, have invented certain new and useful Improvements in a Combined Tap and Faucet; and I do hereby declare the following to be a full, clear, and exact description of the invention, such as will enable others skilled in the art to which it appertains to make and use the same.

My invention relates to a tap and faucet combined for drawing liquids from casks and barrels, and it is designed more especially as an improvement in that class of devices in which the faucet is adapted to manipulate an internal valve to open and close the liquid-passage through the tap. It is desirable in devices of this kind to so construct the bushing, tap, and valve as to insure the direct flow of liquid centrally through the parts and directly to the axial passage in the faucet; to dispense with the use of springs which are liable to lose their tension and render the device unserviceable; to provide for the positive action of the internal valve and to insure the same seating itself tightly to prevent leakage of the liquid; to join the various parts together in a manner to secure tight joints between them and also effectually obviate leakage around the joints when the valve is open; to prevent tampering with the bushing and tap prior to the attachment of the faucet, and to connect the faucet with the operating devices for the internal valve in a positive manner and provide for the ready separation and coupling of the devices.

The object of my invention is to provide a tap and faucet constructed to secure the desirable ends above set forth and which at the same time is simple, light, and durable in construction, efficient and reliable in service, and cheap of manufacture.

To the accomplishment of these ends my invention consists in the novel combinations of devices and in the construction and arrangement of parts which will be hereinafter described and claimed.

To enable others to understand my invention, I have illustrated the preferred embodiment of the same in the accompanying drawings, forming a part of this specification, and in which—

Figure 1 is a longitudinal sectional view through the faucet, tap, and bushing, showing the faucet adjusted in a position where its discharge-nozzle is vertical and the internal valve is open to insure the passage of liquid through the device. Fig. 2 is a view showing the tap-shell, bushing, and internal valve in longitudinal section, with the faucet partly in section and partly in elevation, and showing the faucet adjusted in a position to close the internal valve and permit withdrawal of the faucet from the tap. Fig. 3 is a front elevation with the faucet detached and showing the bushing and tap with their front faces flush with each other. Fig. 4 is a detail view of the faucet detached from the tap and bushing. Fig. 5 is a detail longitudinal sectional view through the bushing. Fig. 6 is a detail view of the tap-shell. Fig. 7 is a detail perspective view of the cam-formed adjuster adapted to be engaged with the faucet-stem and with the internal valve to operate the latter. Fig. 8 is a detail view of the internal valve, partly in section, to illustrate its construction more clearly.

Like letters of reference denote corresponding parts in all the figures of the drawings, referring to which—

A designates the bushing. B is the tap-shell, which is fitted within the bushing. C is the internal valve, adapted to close the inner end of the bushing against the ingress of liquid. D is the faucet, the stem of which passes through the bushing and tap-shell, and E is the adjuster, connected with the stem of the faucet to be operated thereby and with the internal valve to move the latter endwise in the bushing and the tap-shell to open and close the liquid-ports in said bushing.

The bushing A is made in a single piece of metal. It is of cylindrical form and is externally screw-threaded at *a* throughout its length to enable it to be screwed into a barrel or cask, in which it is designed to be fastened permanently, although it is evident that it can be removed, for which purpose the front face of the bushing is formed with diametrically opposite notches $a'$ to receive the wrench by which the bushing may be unscrewed from the cask or screwed into the same. The front end of the bushing has an external flange $a''$, which limits the distance the bushing is screwed into the cask, because the flange is adapted to abut against the wall of the cask. The internal diameter of the bushing varies, as shown by the drawings, because the rear part of the bushing is smaller than the front part, and a shoulder or ledge $f$ lies between the smaller inner end $f'$ of the bushing-chamber and the larger outer end $f''$ of said chamber. The wall of the inner reduced part $f'$ of the chamber is smooth, but the wall of the larger outer part of the chamber is threaded from the open front end of the bushing nearly up to the annular ledge or shoulder $f$, for a purpose to be explained.
The inner end of the bushing has an integral head $A'$, and said head is furnished with a circular row of ingress-ports $g$ and with a central stud $g'$, which projects forwardly from the head and is inclosed within the bushing, said stud $g'$ serving to enter the liquid-passage in the compressible plug of the internal valve when the latter is forced back to close the ports $g$ in the bushing-head, whereby the stud serves to close the passage in the internal valve, while the valve itself closes the ports $g$ in the bushing, thus reducing to a minimum the liability of leakage of the liquid.

The tap-shell B is of cylindrical form and externally threaded at $b$ for a portion of its length to enable it to be screwed into the enlarged threaded front part $f''$ of the bushing, but the threads $b$ do not extend the full length of the tap-shell, so that the shell is adapted to form a close joint with the ledge or shoulder $f$ and the smooth part just in front of said shoulder on the threaded part $f''$ of the bushing. The tap-shell thus fits in the bushing to secure a tight joint therewith against the leakage of liquid, and the front end of said tap-shell lies flush with the front face of the bushing. Said front end of the tap-shell has notches $b'$ to receive a wrench for turning the tap-shell, and said shell B is fastened within the bushing by a suitable key or retainer, one form of which is shown in the drawings as consisting of a small screw $b''$, which is screwed into alined threaded recesses in the bushing and shell. The rear smooth part of the tap-shell B has straight slots $h\ h'$, formed therein at diametrically opposite points, and these slots extend longitudinally of the shell from the points where the external threads $b$ terminate to and open through the rear end of the shell, as shown. The shell B is further provided with an internal partition I, the front part of which forms an annular ledge or shoulder $i$, while in this partition in rear of the annular ledge or shoulder $i$ is provided an irregular keyway $i'$ of a size and shape to permit the key on the rear end of the faucet-stem to pass through said partition in order that the key on the faucet-stem may be connected with the adjuster E.

The faucet D may be of any preferred form or style known to those skilled in the art, but as a preferred construction I have shown the faucet as having a straight barrel constructed to receive the turning-plug $D'$ and the removable nozzle $D''$. The handle of the turning-plug is arranged at right angles to the axis of the liquid-port in the plug, and when the plug is turned to have its port coincide with the liquid-passage $d^5$ through the faucet the handle of the plug lies transversely across the barrel of the faucet, whereby the handle of the plug when turned to a position parallel to the barrel, as in Fig. 2, serves as a means to afford a firm grasp for the hand in adjusting the faucet. The front end of the barrel of the faucet is externally screw-threaded at $e'$, and the faucet-nozzle $D''$ is threaded internally to enable it to be screwed to the threaded part $e'$ of the faucet. The nozzle $D''$ may be detached from the faucet and a hose or tube attached to the faucet to enable the liquid to be conveyed to any desired place. Near the rear end of the faucet-barrel is provided an enlarged annular flange $j$, and from this flange extends the stem J, which is turned down to form the collar and washer-seat $j'$ and the key K. A compressible washer or gasket $j''$ is fitted on the stem of the faucet, and said stem and washer are adapted to fit in the tap-shell in a manner for the washer to bear against the annular shoulder $i$ therein, thus producing a tight joint between the faucet-stem and the tap-shell. The key K is of wedge form, and it lies in a plane transverse to the axis of the liquid-passage $d^5$ through the faucet-barrel. This key is situated at the extreme rear end of the stem J of the faucet, and it is separated from the shoulder and gasket-seat by a cylindrical part or section $k$ of the faucet-stem, as shown. This key is provided with inclined or cam surfaces $k'\ k'$, which lie on opposite sides of the axis of the faucet and which are inclined reversely to each other, and these cam-faces of the key are adapted to ride against the rear surface of the partition I in the tap-shell, whereby said surfaces of the key are caused to draw the faucet endwise and compress the gasket or washer $j''$ between the annular shoulder $i$ of the tap-shell and the collar $j'$ of the faucet-stem.

The valve-adjuster E is made in a single piece of cylindrical form and of a diameter to fit snugly within the rear part of the tap-shell just behind the partition I therein. The adjuster is provided at its front end with a flange or head $l$, in which is formed the slot or opening $l'$ of a form to correspond to the keyway in the partition I, and in this opening $l'$ is adapted to fit the key K of the faucet, so as to couple the adjuster E to the faucet-stem and cause the adjuster to rotate or turn with the faucet. This adjuster E is formed with cams $m\ m$ by cutting inclined slots therein. I prefer to make the slots of spiral form and to incline them in reverse directions, the slots opening through the rear edge of the cylindrical adjuster at diametrically opposite points. The adjuster is designed to fit snugly within the tap-shell, so as to turn freely therein, and the rear edge of the adjuster and the tap-shell are substantially flush, said shell and adjuster lying in advance of the head A' of the bushing, so as to leave a space between said head $a'$ and the shell and adjuster to accommodate the valve C. This valve C is cylindrical in form to fit within the cylindrical adjuster, and it is provided with the laterally-projecting pins or studs $c\ c$, which extend therefrom at diametrically opposite points and are fitted in the spiral slots of the adjuster and the straight parallel slots of the tap-shell. The studs or pins $c\ c$ are adapted to slide in the straight slots of the tap-shell and thus limit the valve C to endwise or sliding movement in the bushing, and as these pins or studs engage with the spirally-slotted adjuster the rotary movement of the adjuster, under the manipulation of the faucet, is converted into sliding movement, which is imparted to the valve C. The valve is thus caused to have a sliding movement when the faucet is given a quarter-turn in the bushing, so that when the faucet is turned to the position shown by Fig. 1 the valve is drawn forward to allow liquid to pass through the ports in the head A', but when the faucet is turned in the reverse direction and to the position indicated by Fig. 2 the adjuster is rotated and its cams operate to force the pins or studs and the valve rearward, thus causing the valve to close the ports $g$ in the head A' of the bushing. The rear part of the cylindrical valve is formed with an annular flange $n$, adapted when the valve is moved forward to abut against the ends of the adjuster and the tap-shell, and from this rear end of the cylindrical valve projects a flanged hollow stem $o$, on which is fitted a compressible plug O. This plug is of cylindrical form and of a diameter corresponding to the diameter of the flanged part of the valve. This compressible plug O is made of rubber or of other appropriate material, and centrally through the cylindrical valve, the stem thereof, and the compressible plug carried by said valve-stem extends a central liquid-passage, which is in axial alinement with the liquid-passage $d^5$ of the faucet.

The operation of my improved tap and faucet may be described as follows: The bushing and tap-shell are attached to the cask or barrel by screwing the bushing into the aperture provided for its reception, and the valve is adjusted to have its plug O bear against the head A' to close the ingress-ports therein. To connect the faucet to the tap and bushing, the faucet is turned to the position indicated by Fig. 2, and it is slipped endwise through the tap-shell and the keyway in the partition I of said shell, and is fitted in the keyway or opening in the valve-adjuster, thus connecting the faucet-stem and the valve-adjuster together. The faucet is now turned to its upright position, (shown by Fig. 1,) and during this adjustment of the faucet the cam-faces on the key K draw the faucet endwise to compress the gasket $j''$ between the shoulders $i\ j'$, and the adjuster E is turned with the faucet to cause its cams or spiral slots to force the pins or studs and the valve C forward, thus drawing the valve C away from the ports in the head A'. The tap is thus opened for the passage of liquid through the ingress-ports in the head A' and the alined liquid-passages in the valve C and the faucet D. When the plug D' in the faucet is opened, the liquid flows freely through the liquid-passages in the valve and faucet and is discharged through the nozzle or the tube connected with said faucet, the plug D' serving to regulate the quantity of liquid drawn off through the faucet. To detach the faucet from the tap and bushing, the faucet is first turned in the reverse direction and to the position shown by Fig. 2 to bring the keyway in the valve-adjuster coincident with the keyway in the partition I of the tap-shell and the key on the faucet into position to pass through said keyways, and at this adjustment of the faucet and the adjuster connected thereto the cams or slots of the adjuster ride against the pins or studs of the valve and force the valve backward for the compressible plug to forcibly bear against the head A' in the bushing to securely close the ports $g$ and to cause the stud $g'$ of said head A' to enter the axial opening in the compressible plug of the valve, thus securely closing the liquid-passage through the plug and valve against the leakage of liquid. When the faucet and valve are thus adjusted, as shown by Fig. 2, the faucet can be withdrawn from the tap-shell and the bushing by simply moving said faucet endwise. It will be seen that the valve is positively and securely closed when the faucet is turned to a position to effect its withdrawal from the tap and that the faucet can be easily detached by simply turning it on its axis and moving it endwise in the manner described. The valve is positively adjusted and securely locked when the faucet is rotated and withdrawn from the tap, and the compressible plug is forced into close contact with the perforated head of the bushing to effectually exclude liquid from the tap when the faucet is detached.

I am aware that changes in the form and proportion of parts and in the details of construction herein shown and described as the preferred embodiment of my invention may be made by a skilled mechanic without departing from the spirit or sacrificing the advantages of my invention, and I therefore reserve the right to make such modifications and alterations as fairly fall within the scope of my invention.

Having thus fully described my invention, what I claim as new, and desire to secure by Letters Patent, is—

1. The combination with a bushing, and a tap-shell fixed therein, of a cam-formed rotatable valve-adjuster fitted in said tap-shell, and a valve provided with means which engage with the valve-adjuster and also with the tap-shell in a manner to insure endwise movement of said valve by the partial rotation of the valve-adjuster and to limit the valve to sliding movement by its connection with the tap-shell, as and for the purposes described.

2. A bushing provided at its inner end with a perforated head A', combined with a fixed tap-shell within said bushing, a slidable valve engaging with the tap-shell to be limited to endwise movement therein and toward or from said perforated head of the bushing, a compressible plug carried by the valve and arranged to be forced thereby against the head of the bushing to close the perforations therein, and a cam-formed rotatable adjuster engaging with said valve to move the latter, as and for the purposes described.

3. A bushing provided at its inner end with a head having a row of perforations and a central lug, combined with a tap-shell fixed in said bushing and provided with slots or guideways, a centrally-perforated valve having projections which fit in said slots or guideways of the tap-shell, a centrally-perforated plug attached to said valve and adapted to be pressed against the head of the bushing and receive the lug thereon, and a valve-adjuster having cam-slots which receive the projections of the valve, as and for the purposes described.

4. The combination with a bushing, of a tap-shell having a keyway formed in a partition thereof and provided with straight guideways, a valve-adjuster provided with a keyway and with cam-slots, a valve fitted in said valve-adjuster and having radial pins which pass through the cam-slots of said adjuster and fit in the straight guideways of the tap-shell, and a faucet carrying a key which fits in the keyway of the valve-adjuster and is adapted to engage with the partition in the tap-shell, substantially as described.

5. The combination with a bushing, of a tap-shell provided with a partition having a keyway and with an annular shoulder in advance of said partition, a faucet having a shouldered stem and a cam-formed key fitted in said tap-shell for the key to ride against the partition, a gasket confined between the shoulder of the faucet-stem and the shoulder of the tap-shell, a valve-adjuster, and a valve, as and for the purposes described.

6. The combination with a bushing, and a tap-shell having the parallel slots, of a valve provided with studs or pins fitted in said slots and limited thereby to endwise movement within the bushing, a rotary cam-formed adjuster fitted in the tap-shell and engaging with the studs or pins of the valve, and a faucet adapted to be connected with said valve-adjuster, as and for the purposes described.

7. The combination of a bushing having ingress-ports and a stud in the head thereof, a tap-shell fixed in said bushing and provided with straight slots and with a partition having a keyway, a cylindrical cam-formed adjuster fitted in said tap-shell in rear of its partition and provided with a keyway adapted to coincide with the keyway in the tap-shell, an endwise-movable valve having studs or pins fitted in the slotted tap-shell and in the cams of said adjuster, and carrying a centrally-perforated compressible plug, and a faucet provided with a key to pass through the keyway in the tap-shell and engage with the keyway in the valve-adjuster, as and for the purposes described.

8. The combination with a bushing and a tap-shell, of a valve limited to sliding movement within said bushing, a valve-adjuster limited to rotary movement and connected positively by coacting cam devices with said valve to move the latter endwise, and means for rotating said valve-adjuster, as and for the purposes described.

9. The combination with a bushing having a valve-seat, of a valve limited to sliding movement in said bushing and toward or from said seat, and a valve-adjuster limited to axially-turning movement in said bushing, said valve and the adjuster being arranged in alinement with each other longitudinally of the bushing and coupled directly by coacting cam devices which convert the turning movement of the adjuster into sliding movement applied to the valve, as and for the purposes described.

10. The combination with a bushing having a valve-seat, and a tap-shell in said bushing, of a valve having slidable connections with the tap-shell to limit the valve to endwise movement, an axially-turning valve-adjuster limited to rotary movement within said tap-shell, said valve and adjuster being connected directly together by positive coacting cam devices that serve to adjust the valve endwise when the adjuster is turned axially, and means adapted to engage with said adjuster to turn the latter, as set forth.

11. The combination with a bushing having a valve-seat, of a tap-shell having an apertured partition, a valve having slidable connections with said tap-shell, a cam-formed adjuster connected directly and positively with said valve to impel the latter endwise and fitted in said tap-shell to be limited to axially-turning movement therein, and a faucet having a cam-formed key adapted to engage the valve-adjuster and to have its cam-faces ride against the partition in the tap-shell, substantially as and for the purposes described.

In testimony whereof I affix my signature in presence of two witnesses.

GEORGE CHAMPOUX.

Witnesses:
   HERBERT E. HAMILTON,
   NAPOLEON BOISVERT.